US011239677B2

(12) United States Patent
Lim et al.

(10) Patent No.: US 11,239,677 B2
(45) Date of Patent: Feb. 1, 2022

(54) BUCK-BOOST BATTERY CHARGER FOR DUAL BATTERY APPLICATION

(71) Applicant: Renesas Electronics America Inc., Milpitas, CA (US)

(72) Inventors: Sungkeun Lim, Cary, NC (US); Yang Li, Fremont, CA (US)

(73) Assignee: RENESAS ELECTRONICS AMERICA INC., Milpitas, CA (US)

( * ) Notice: Subject to any disclaimer, the term of this patent is extended or adjusted under 35 U.S.C. 154(b) by 110 days.

(21) Appl. No.: 16/846,152

(22) Filed: Apr. 10, 2020

(65) Prior Publication Data

US 2020/0358295 A1 Nov. 12, 2020

Related U.S. Application Data

(60) Provisional application No. 62/845,641, filed on May 9, 2019.

(51) Int. Cl.
*H01M 10/46* (2006.01)
*H02J 7/00* (2006.01)
*H02J 7/02* (2016.01)

(52) U.S. Cl.
CPC ............ *H02J 7/007* (2013.01); *H02J 7/0025* (2020.01); *H02J 7/0044* (2013.01); *H02J 7/02* (2013.01)

(58) Field of Classification Search
CPC ........ H02J 7/007; H02J 7/0025; H02J 7/0045; H02J 7/0013; H02J 7/02
USPC ................. 320/110, 116, 137, 138, 161, 162
See application file for complete search history.

(56) References Cited

U.S. PATENT DOCUMENTS

2017/0279284 A1 * 9/2017 Lim ..................... H02J 7/0045

FOREIGN PATENT DOCUMENTS

GB 2476880 A * 7/2011 .............. H02J 7/025

* cited by examiner

*Primary Examiner* — Edward Tso
(74) *Attorney, Agent, or Firm* — Foley & Lardner LLP

(57) ABSTRACT

One or more embodiments are directed to a battery charger that can support multiple battery applications with a single USB type-C port. The architecture can be easily extended to support more applications such as those including two or more USB Type-C ports by adding additional voltage regulators. Additionally, the architecture can easily be extended to support additional batteries by adding corresponding battery chargers. Some embodiments enable supplying two or more system voltages and charging two or more batteries simultaneously using a single adapter and/or port. Other embodiments enable supplying voltage to On the Go devices from two or more batteries simultaneously.

20 Claims, 7 Drawing Sheets

BUCK-BOOST BATTERY CHARGER FOR DUAL BATTERY APPLICATION

CROSS-REFERENCE TO RELATED APPLICATIONS

The present application claims priority to U.S. Provisional Application No. 62/845,641 filed May 9, 2019, the contents of which are incorporated herein by reference in their entirety.

TECHNICAL FIELD

The present embodiments relate generally to consumer, industrial, and hand held computing, and more particularly to battery chargers for systems having two or more separate battery stacks.

BACKGROUND

Current battery charger products only support systems having a single USB type-C port and a single battery. Meanwhile, new systems are being developed that include subsystems with two or more battery stacks. Such systems cannot be supported by existing battery charger products. Accordingly, a solution to these and other problems is needed.

SUMMARY

One or more embodiments are directed to a battery charger that can support multiple battery applications with a single USB type-C port. The architecture can be easily extended to support more applications such as those including two or more USB Type-C ports by adding additional voltage regulators. Additionally, the architecture can easily be extended to support additional batteries by adding corresponding battery chargers. Some embodiments enable supplying two or more system voltages and charging two or more batteries simultaneously using a single adapter and/or port. Other embodiments enable supplying voltage to On the Go devices from two or more batteries simultaneously.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain aspects, the present embodiments relate to a battery charger that can support multiple battery applications with a single Universal Serial Bus (USB) type-C port. In some embodiments, the batteries can have different voltage capacities. In some embodiments, the battery charging current for the batteries, and the current limits for each battery, can be controlled separately. In some embodiments, the architecture is modular such that the architecture can be extended to support multiple battery applications by adding additional buck charger modules and/or extended to support multiple USB Type-C port applications by adding additional Buck Boost regulator modules. In some embodiments, the power supplied by the chargers can be summed.

Figure 1:
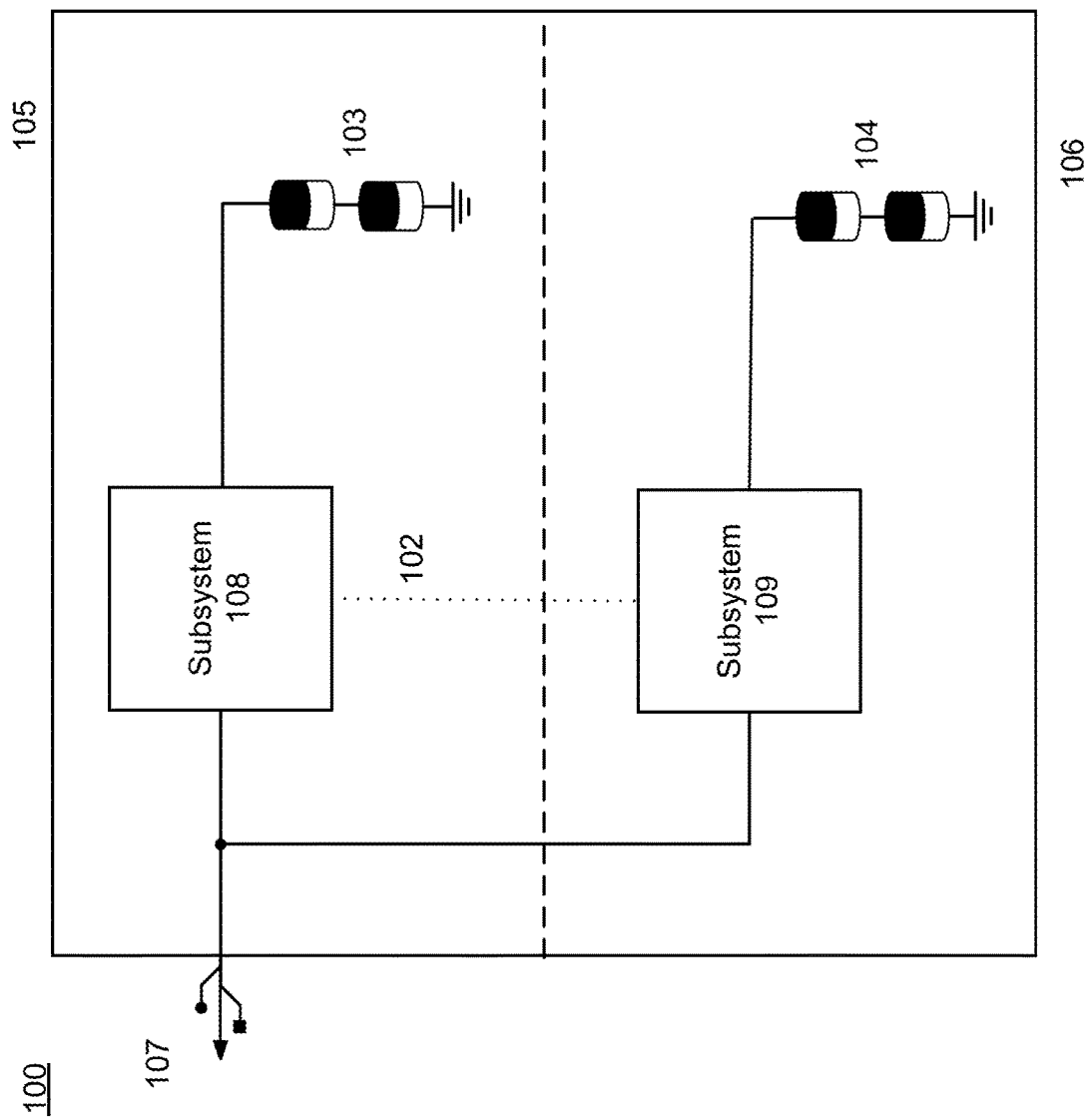
FIG. 1 is a top-level diagram illustrating aspects of an example system according to embodiments.

FIG. 1 is a top-level diagram illustrating aspects of an example system 100 according to embodiments. In some embodiments, system 100 can be and/or include a computing device such as a notebook computer (e.g. MacBook, Ultrabook, etc.), laptop computer, pad or tablet computer (iPad, Surface, etc.), cell-phone (e.g. Samsung Galaxy Z Flip phone) etc., a power bank, Universal Serial Bus (USB) ports, or any system using a battery and capable of receiving power from an adapter.

System 100 includes subsystems 108 and 109. One or both of these subsystems can include a CPU running a conventional operating system such as Windows or Apple OS, and can be an x86 processor from Intel, AMD or other manufacturers, as well as other processors made by Freescale, Qualcomm, DSPs, GPUs, etc. It should be apparent that system 100 can include many other components not shown such as solid state and other disk drives, memories, peripherals, displays, user interface components, etc.

In one example, system 100 can be a clamshell portable device. One such example of a clamshell portable device is the Samsung Galaxy Z Flip phone. This device has two foldably connected screens (e.g. 105 and 106 in FIG. 1) that can operate as one combined screen when fully opened. Alternatively, the phone can operate with one screen while the second screen is folded away. In this example, each screen 105 and 106 has its own subsystem 108 and 109.

In other embodiments, subsystem 109 in system 100 can be configured to implement a touch screen 106 configured for user input, while subsystem 108 in system 100 can implement a computing device that is operative in response to user inputs from subsystem 109 and generates a display on screen 105. In these and other embodiments, the screens and subsystems can be detachable and operate independently. For example, screen 105 in system 100 can detach from screen 106. While detached, each screen, because of the screen's independent subsystem, can operate under its own battery power.

According to certain aspects, system 100 in which the present embodiments can find particularly useful application has operational power needs that can exceed the power limits of technologies such as USB-A, for example over 60 watts. However, the present embodiments are not limited to applications in such systems.

As discussed above, subsystems 108 and 109 within system 100 each have their own battery stacks 103 and 104, respectively. Further, the subsystems 108 and 109 may communicate with each other, as indicated by 102, but this is not necessary in all embodiments. The batteries 103 and 104 can have different storage capacities and charged separately via a power adapter connected to a single port 107 (e.g. USB-C) in one of the screens 105, 106. In alternate embodiments, each subsystem can have their own port. Further, each subsystem can have different power requirements. For example, subsystem 108 can demand one amount of power, while subsystem 109 can demand a different amount of power. As such, the present application recognizes that there is a need to control battery charging current and voltage independently for each of the systems.

Figure 2:
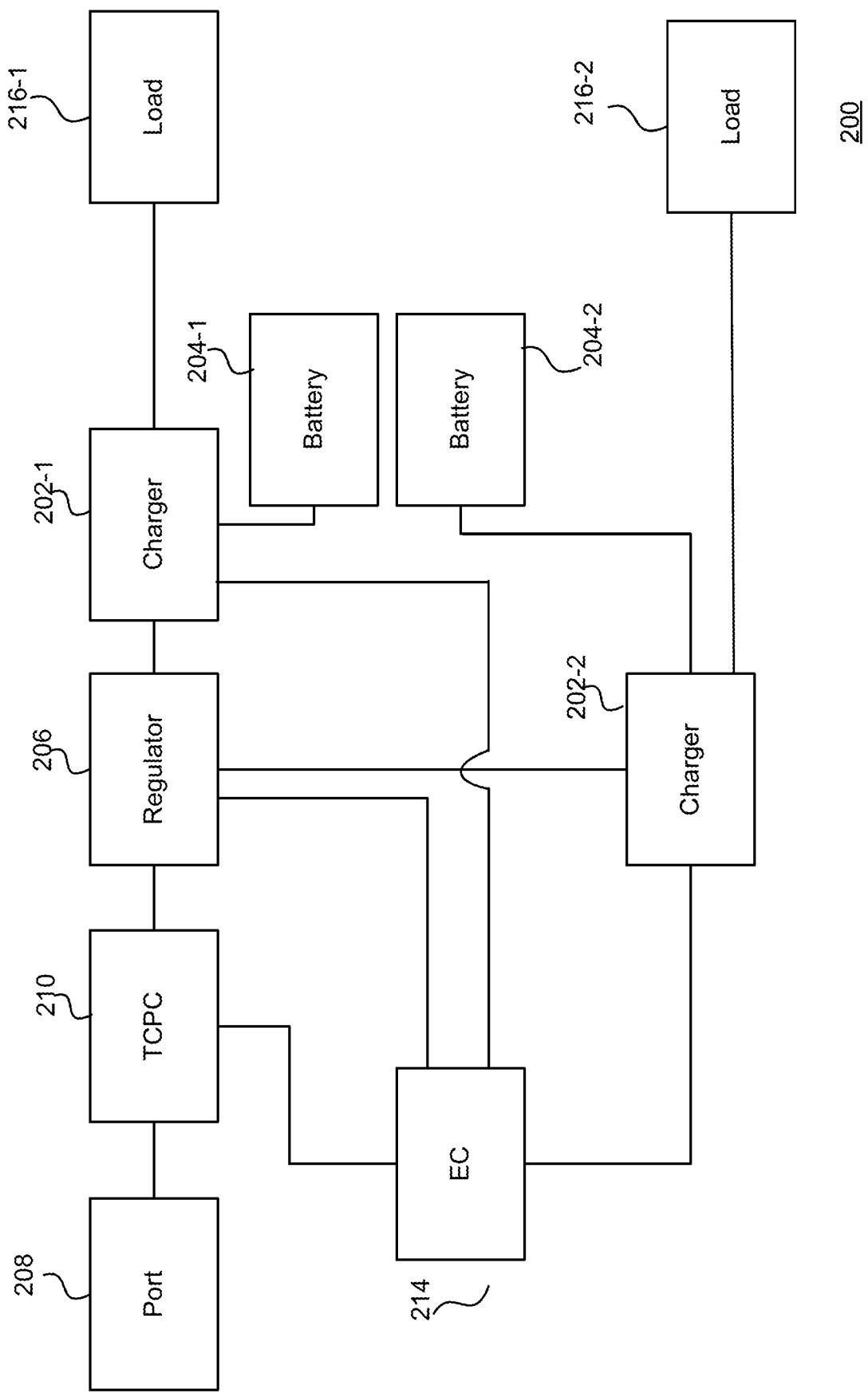
FIG. 2 is a block diagram illustrating aspects of a system for charging two batteries from a single adapter or port according to the present embodiments.

FIG. 2 is a block diagram illustrating aspects of the present embodiments. FIG. 2 illustrates system 200 with subsystems 116-1 and 116-2. In other embodiments, additional subsystems may operate in system 200.

Port 208 can include, but is not limited to USB ports, such as USB Type C (USB C) ports or a USB Power Delivery (USB PD) port. In a USB Type C example such as that shown in FIG. 2, port 208 has an associated Type C port controller (TCPC) 210. The TCPC 210 includes functionality for detecting the presence and type of device attached to port 108, controlling switches associated with connecting the attached device to other system 200 components, and for communicating port status to Embedded Controller (EC) 214 (e.g. via an I2C interface).

EC 214 is generally responsible for managing power configurations of system 200 (e.g. determining whether a power adapter is connected or not connected to port 108 and communicating the determination to EC 214 from TCPC 210, etc.), receiving battery status from batteries 204-1 to 204-2 (e.g. via a separate or incorporated fuel gauge circuit), and for communicating battery charging and other operational control information to battery chargers 202-1 and 202-2 (e.g. via SMbus interface) and voltage regulator 206. The EC 214 can communicate with the voltage regulator module and battery charger modules, including at least the controllers housed within the modules via known protocols such as I2C or SMBus. For example, a controller can receive information from TCPC functionality connected to port 208 via controllers inside the module or elsewhere regarding devices attached thereto. The EC can subsequently send control signals to the controllers for controlling the operations of the voltage regulator module 206 and battery charger modules 202-1 and 202-2 in accordance with the information. In some embodiments, the EC 214 can communicate with controllers housed within the voltage regulator module and battery charger module to control the overall operation of system 200 such that power can be delivered to a subsystem (e.g. loads 216-1 and 216-2 via an output voltage) and/or charge a battery (e.g. batteries 204-1 and 204-2).

As shown, system 200 includes chargers 202-1 and 202-2 for each battery 204-1 and 204-2. The present scheme supports additional batteries when corresponding battery chargers are added. In some embodiments, chargers 202 can include one or more buck narrow output voltage DC (NVDC) chargers. The chargers can include some or all of the following features: configurable as an HPB charger or NVDC charger; compliant with Intel PROCHOT #and PSYS requirements; includes adapter current monitor and battery discharging current monitor; uses NFET for all the switches; supports battery removal during Battery Learn mode; provides actively controlled inrush current to prevent FET damage; includes SMBus programmable settings and high accuracy; includes comprehensive protection features such as PROCHOT #indicator for system low voltage, adapter overcurrent, battery overcurrent, or system overheating, hardware-based adapter current and battery current limits and supports sudden battery removal in system Turbo mode; includes multiple switching frequency options from 350 kHz to 1 MHz; provides low quiescent current, SMBus and auto-increment I2C compatible; includes a Renesas Robust Ripple Regulator (R3) modulation scheme that provides excellent light-load efficiency and fast dynamic response; can be implemented in a 32 Ld 4×4 mm$^2$ QFN package; and is Pb-free (RoHS compliant). For example, the charger can be ISL95522 from Renesas Electronics America.

System 200 also includes voltage regulator 206 for port 208. The present scheme supports additional ports when corresponding voltage regulators are added. The voltage regulator can include some or all of the following features: it can support bidirectional buck, boost and buck-boost operation; it is configurable for 4-switch buck-boost or 2-switch buck operation; it has an input voltage range of 3.6V to 24V (no dead zone); it has an output voltage up to 20V; it operates up to 1 MHz switching frequency; it supports a pin programmable soft-start time; it provides a LDO output for VDD and VDDP; it provides a system status ALERT function; it provides an input/output internal discharge function; it supports active switching for negative voltage transitions; it provides a bypass rode in both directions; it includes forward and reverse mode enable pins; it provides OCP, OVP, UVP and OTP protection; it provides absolute overvoltage protection; it is SMBus and auto-increment I$^2$C compatible, it is Pb-free (RoHS compliant); and it can be implemented as a 32 Ld 4×4 TQFN package. For example, the voltage regulator can be RAA489801 from Renesas Electronics America.

According to certain general aspects, during operation of system 200, when a power adapter is plugged into port 208, chargers 202-1 and 202-2 can be configured to charge batteries 204-1 and 204-2. The regulator 206 is adapted to convert the power from the adapter to a voltage suitable for components of system 200. The regulator can supply power in a buck mode, a boost mode, a buck-boost mode, or other methods well known in the art (e.g. using well known PWM modulation signals provided to power MOSFETs in response to a sensed output voltage that is fed back to a controller of regulator 206). In some embodiments, the regulated output voltage supplied to batteries or loads can be a fixed 7-8V.

According to certain other general aspects, when a USB OTG device (e.g. a cell phone, etc.) is connected to port 208, charger 202-1 and 202-2 and regulator 206 are configured to manage the supply of power from battery 204-1 and/or 204-2 to port 208. The regulator can operate in reverse to provide power in a reverse buck mode, a reverse boost mode, a reverse buck-boost mode, or other methods well known in the art to output a regulated voltage to port 208 from battery 204-1 and/or 204-2. The regulated output voltage supplied to the OTG device can be the full OTG functionality range (e.g. providing OTG voltages from 5V to 20V). Further details of chargers 202-1 and 202-2 and regulator 206 according to the present embodiments will be provided below.

In notebook computer (e.g. Ultrabook) and other embodiments of system 200, batteries 204 can be a rechargeable 1S/2S/3S/4S (e.g. 1 cell, 2 cell, 3 cell, or 4 cell stack) Lithium-ion (Li-ion) battery.

Figure 3:
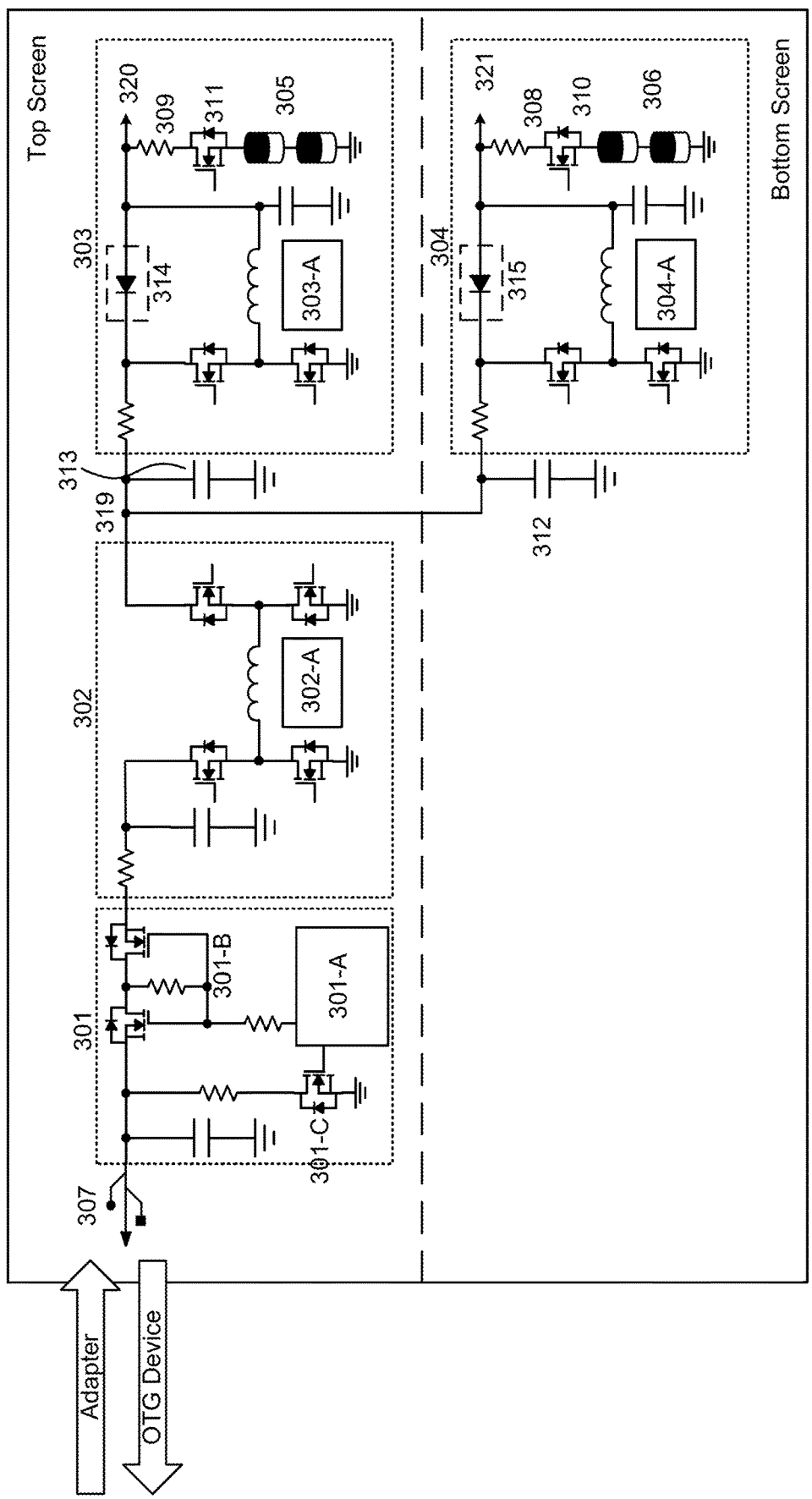
FIG. 3 is a schematic diagram illustrating an example battery charger for two or more systems and corresponding battery stacks according to embodiments.

FIG. 3 is a schematic diagram illustrating an example implementation of the architecture shown in FIG. 2 according to embodiments.

As can be seen, indicated by dashed boxes, there is a port detection (PD) controller module 301, a voltage regulator module 302, and two charger modules 303 and 304—one providing an output voltage for each load 320 and 321, and batteries 305 and 306 respectively. The charger modules 303 and 304 support providing system power for loads 320 and 321 and for charging batteries 305 and 306. This architecture supports bidirectional current flow such that batteries 305 and 306 can be charged (e.g. the adapter on port 307 is a source), or supplying power to an OTG device connected to port 307 (e.g. where the OTG device on port 307 is a sink).

Port 307 is connected to the PD controller module 301, which includes a PD-IC 301-A. Further, a 10 μF capacitor can be used as a port side capacitor. In some embodiments, the PD-IC can be implemented by a PD controller together with other components. In other embodiments, the PD-IC can be implemented by a Type C port controller TCPC and can be implemented by a USB Power Delivery Controller R9A02G011 from Renesas Electronics America, for example. Further, the PD controller and some or all of the FETs 301-B and 301-C can be implemented together in a common integrated circuit.

The PD-IC 301-A controls a pair of back-to-back FETs 301-B and a single FET 301-C. When an adapter is not connected and instead a power consuming device (e.g. an OTG device) is connected to port 307, the PD-IC 301-A controls the FETs 301-B so as to couple the OTG voltage, from the batteries 305 and 306 via converter 302, charger 303 and 304, and BGATE FETs 310 and 311 to the port 307. When an adapter is connected to port 307, PD-IC 301-A controls the FETS 301-B so as to couple the adapter voltage via converter 302 to the battery chargers 303 and 304 to provide output voltages 320 and 321 and/or charge batteries 305 and 306. The PD-IC 301-A controls the FET 301-C to implement VBUS force discharge or bleed discharge to satisfy the USB PD requirement.

The voltage regulator module 302 takes an input voltage and provides a regulated output voltage at voltage Vmid 319. Each additional port added to the present scheme should have a voltage regulator coupled to it. The voltage Vmid 319 becomes the input voltage for the charger modules 303 and 304.

The voltage regulator module power stage should be designed based on the maximum adapter power. The voltage regulator module can include a voltage regulator controller, as discussed above, and other components (e.g. an inductor and switching transistors or power MOSFETs). While a voltage regulator controller is described, the disclosure is not limited to voltage regulator controllers and can include buck-boost converters, boost converters, buck converters, integrated circuits with identical functionality and the like. For example, the controller can be implemented as integrated circuits to which the switching transistors, associated drivers, and inductor are externally connected. In other embodiments, some or all of the switching transistors, and/or associated drivers, and the inductor can be integrated together with the voltage regulator controller in a single integrated circuit. It should be apparent that many different implementations of the voltage regulator controller together with other voltage regulator components are possible. The components can include high-side/low-side switching transistors connected to either end of an inductor, as shown in FIG. 3 and is well known in the art. The voltage regulator controller 302-A can provide control signals to the switching transistors in the voltage regulator module to implement either a buck, boost, or buck-boost mode of operation.

The battery charger module 303 helps support unique voltage and current demands to supply the regulated voltage Vmid from regulator 302 to battery 305. There are also battery side sensing resistors 309 and capacitor 313. Battery charger module 303 can take an input voltage and provide a regulated output voltage while also being able to charge a battery. The battery charger 303 charges battery 305 by operating BFET 311. When an adapter is connected to port 307, the battery charger supplies battery 305 with voltage by configuring BFET 311 such that the BFET operates in its linear mode. When an adapter is not connected to port 307, the battery charger configures BFET 311 such that the BFET operates in an ideal diode mode, allowing the power to flow from battery 305 to the output supply voltage 320. In FIG. 3, a buck charger is implemented. However, the present embodiments are not limited to buck chargers, and can include boost chargers and buck-boost chargers.

The charger modules can be designed based on the maximum power required for the system (e.g. load voltage 320). The battery charger module can include a battery charger controller, as discussed above, and other components (e.g. an inductor and switching transistors or power MOSFETs). While a battery charger controller is described, the disclosure is not limited to battery charger controllers and can include buck-boost chargers, boost converters, buck converters, integrated circuits with identical functionality and the like. For example, the controller can be implemented as integrated circuits to which the switching transistors, associated drivers, and inductor are externally connected. In other embodiments, some or all of the switching transistors, and/or associated drivers, and the inductor can be integrated together with the battery charger controller in a single integrated circuit. It should be apparent that many different implementations of the battery charger controller together with other battery charger components are possible. The components can include high-side/low-side switching transistors connected to either end of an inductor, as is well known in the art.

The battery charger module 304 helps support unique voltage and current demands to supply the regulated voltage Vmid from regulator 302 to battery 306. There are also battery side sensing resistors 308 and capacitor 312. Battery charger module 304 can take an input voltage and provide a regulated output voltage while also being able to charge a battery. The battery charger 304 charges battery 306 by operating BFET 310. When an adapter is connected to port 307, the battery charger supplies battery 306 with voltage by configuring BFET 310 such that it operates in its linear mode. When an adapter is not connected to port 307, the battery charger configures BFET 310 such that it operates in an ideal diode mode, allowing the power to flow from battery 306 to the output supply voltage 321. In FIG. 3, a buck charger is implemented. However, the present embodiments are not limited to buck chargers, and can include boost chargers and buck-boost chargers.

The charger modules can be designed based on the maximum power required for the associated subsystem (e.g. load voltages 320, 321). The battery charger module can include a battery charger controller, as discussed above, and other components. While a battery charger controller is described, the disclosure is not limited to battery charger controllers and can include buck-boost chargers, boost converters, buck converters, integrated circuits with identical functionality and the like. For example, the controller can be implemented as integrated circuits to which the switching transistors, associated drivers, and inductor are externally connected. In other embodiments, some or all of the switching transistors, and/or associated drivers, and the inductor can be integrated together with the battery charger controller in a single integrated circuit. It should be apparent that many different implementations of the battery charger controller together with other battery charger components are possible. The components can include high-side/low-side switching transistors connected to either end of an inductor, as is well known in the art.

Figure 4A:
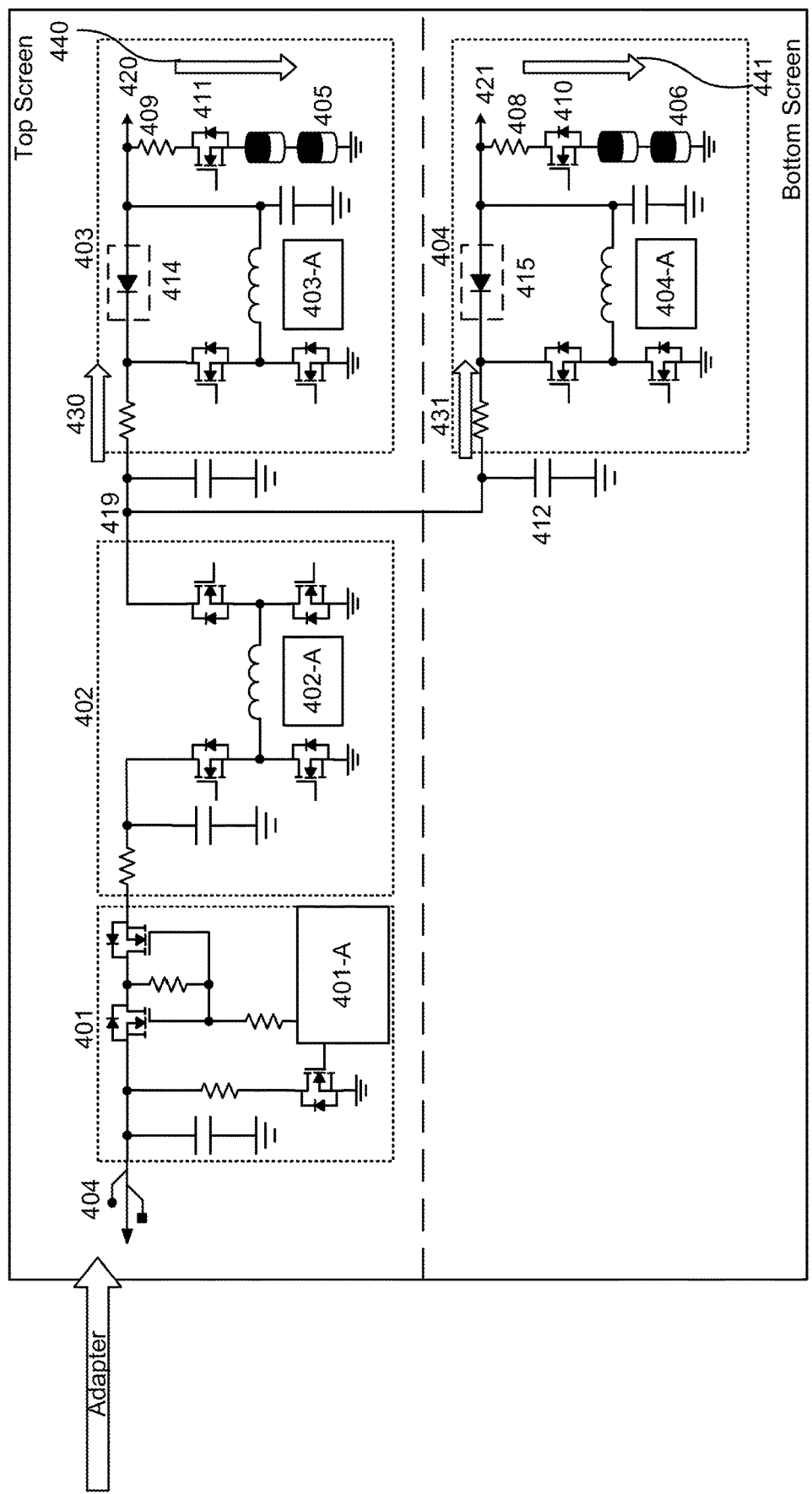
FIG. 4A illustrates an example operation of the battery charger in FIG. 3 with a plug-in adapter.

FIG. 4A illustrates an example operation of the battery charger in FIG. 3 with a plug-in adapter. In some embodiments, an EC can signal the voltage regulator modules 403 and 404 to set the output voltage connected to loads 420 and 421 respectively, lower than the minimum battery voltage. Next, an EC can signal the battery charger modules 403 and 404 to enable charging by driving the BGATE output to the gate of the BGATE FETs 410 and 411 to an "on" state. At or about the same time, the EC can signal the battery charger modules 403 and 404 to set its BGATE output to tri-state. In this manner, Vmid 419 will be higher than the input voltage for charger modules 403 and 404 and the voltage at Vmid 419 can be used to charge batteries 405 and 406. After enabling charging, the EC can signal the battery chargers 403 and 404 to change the output voltage connected to the system voltages 420 and 421 of the battery chargers to the maximum battery voltage. At or about the same time, an EC can signal the battery chargers 403 and 404 to set their output voltage to supply charging power and/or system demand. The EC can also signal the voltage regulator 402 to adjust the voltage received from the adapter on port 404 such that the demands of the charger modules 403 and 404, or the demands of the system voltage 420 and 421, are satisfied.

In some embodiments, the controllers in the battery chargers 403 and 404, and/or the voltage regulator 402, may operate in either a buck, a boost, or a buck-boost mode of operation depending on the particular values of the adapter voltages connected to the port 404, the battery charging voltages, and the system voltages 420 and 421, as will be appreciated by those skilled in the art.

Batteries 405 and 406 may be at different charges, thus the voltage required to charge the batteries, and the corresponding current may be different. Batteries 405 and 406 can be supplied with different current such that the batteries can be charged given their different voltages and their different current requirements, simultaneously. In some embodiments, batteries 405 and 406 may have different current limitations. In some embodiments, diodes 414 and 415 can be implemented to satisfy the different current 430 and 431, and ensure that the proper current amounts 440 and 441 are supplied to the batteries.

Figure 4B:
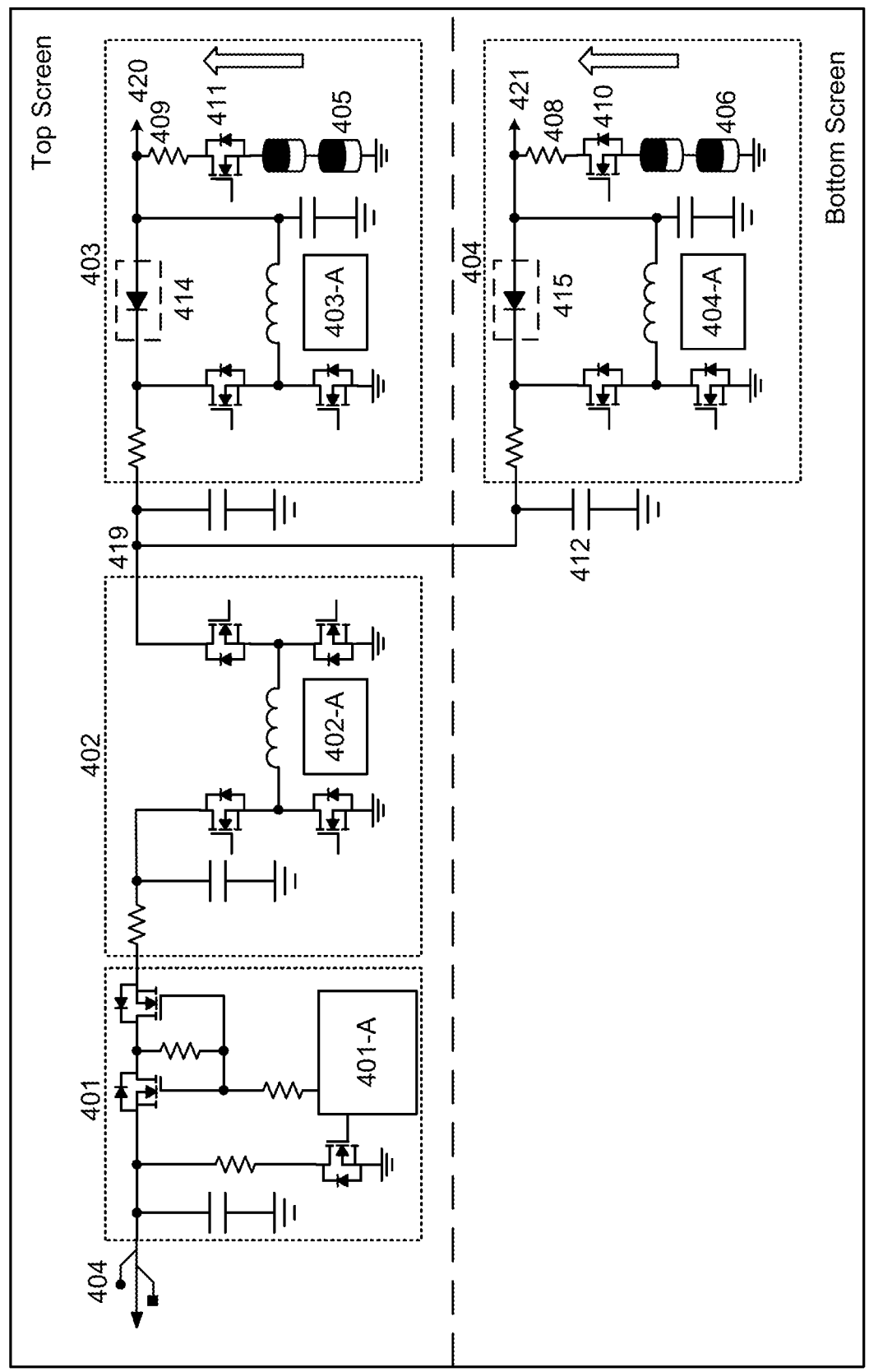
FIG. 4B illustrates an example operation of the battery charger in FIG. 3 in a battery only mode.

FIG. 4B illustrates an example operation of the battery charger in FIG. 3 in a battery only mode. In a battery only mode, each of the batteries 405 and 406 are supplying power to load voltages 420 and 421 respectively. The batteries 405 and 406 supply power to meet the power demands of loads 420 and 421 via BGATES 410 and 411, which are in an "on" state. All of the other FETs, such as the high-side/low-side transistors, are "off". In some embodiments, diodes 414 and 415 can be implemented to prevent current from passing to the rest of the modules.

Figure 4C:
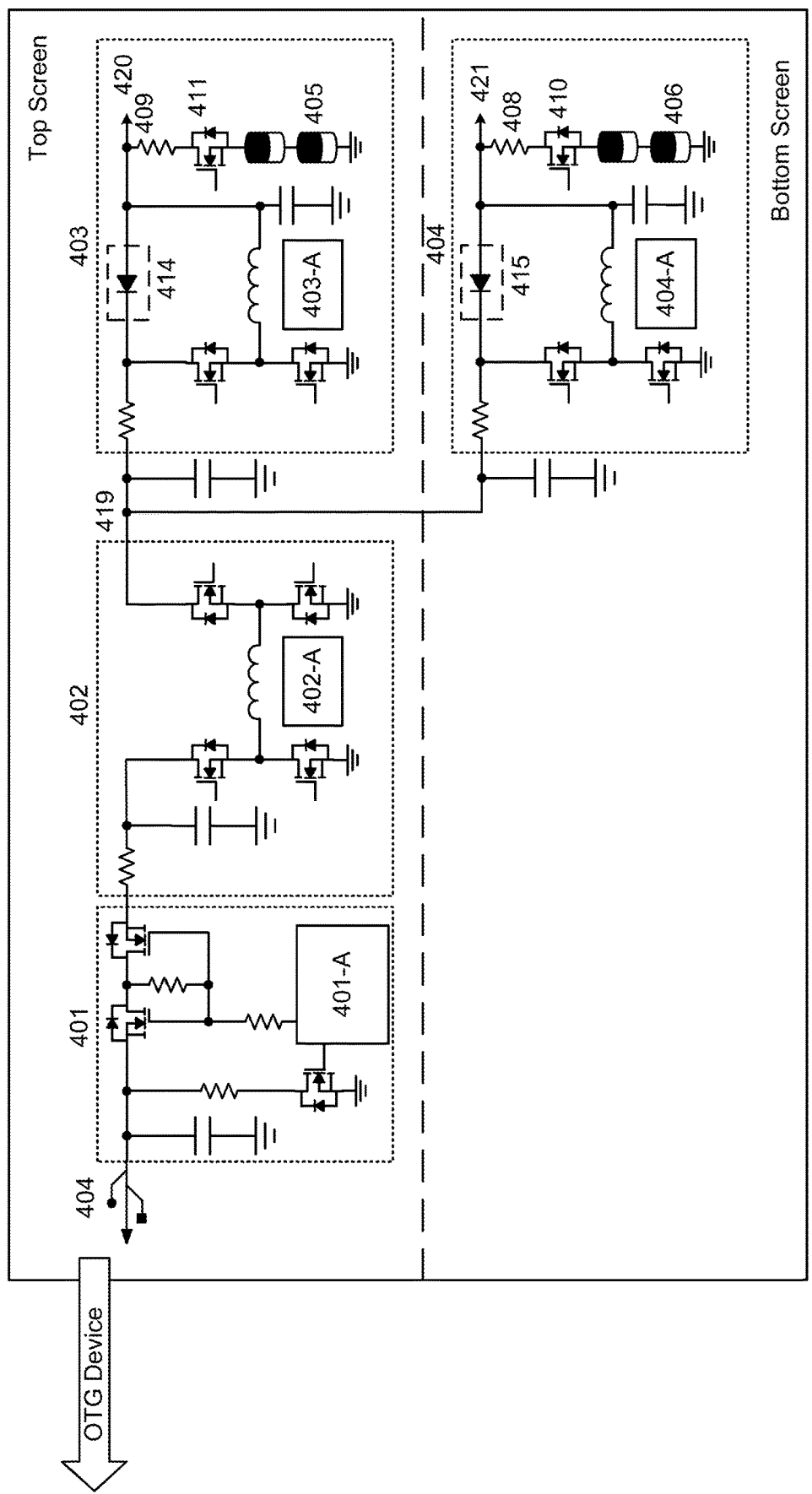
FIG. 4C illustrates an example operation of the battery charger in FIG. 3 with a plug in On The Go device.

FIG. 4C illustrates an example operation of the battery charger in FIG. 3 with a plug in OTG device. In some embodiments, as discussed above, an EC can determine which battery is used to charge the OTG device depending on how the EC configures the modules. In other embodiments, an EC may not be used. In this situation, the battery with the higher charged voltage will be used to power the OTG device. This occurs because the voltage at Vmid 419 will be determined by the higher battery voltage. In some embodiments, the voltage at Vmid 419 will be, for example, the voltage of the charged battery plus the voltage drop across the diode. The optional diodes 414 and 415 can, for example, be Oring diodes. As discussed above, the present disclosure can support full OTG functionality (e.g. providing a full range of OTG voltage from 5V to 20V) because the voltage regulator 402 regulates the voltage supplied by charger modules 403 and 404 to meet the OTG device demands. For example, the regulators may boost the voltage supplied from Vmid 419, buck the voltage supplied from Vmid 419, or some combination.

Figure 5:
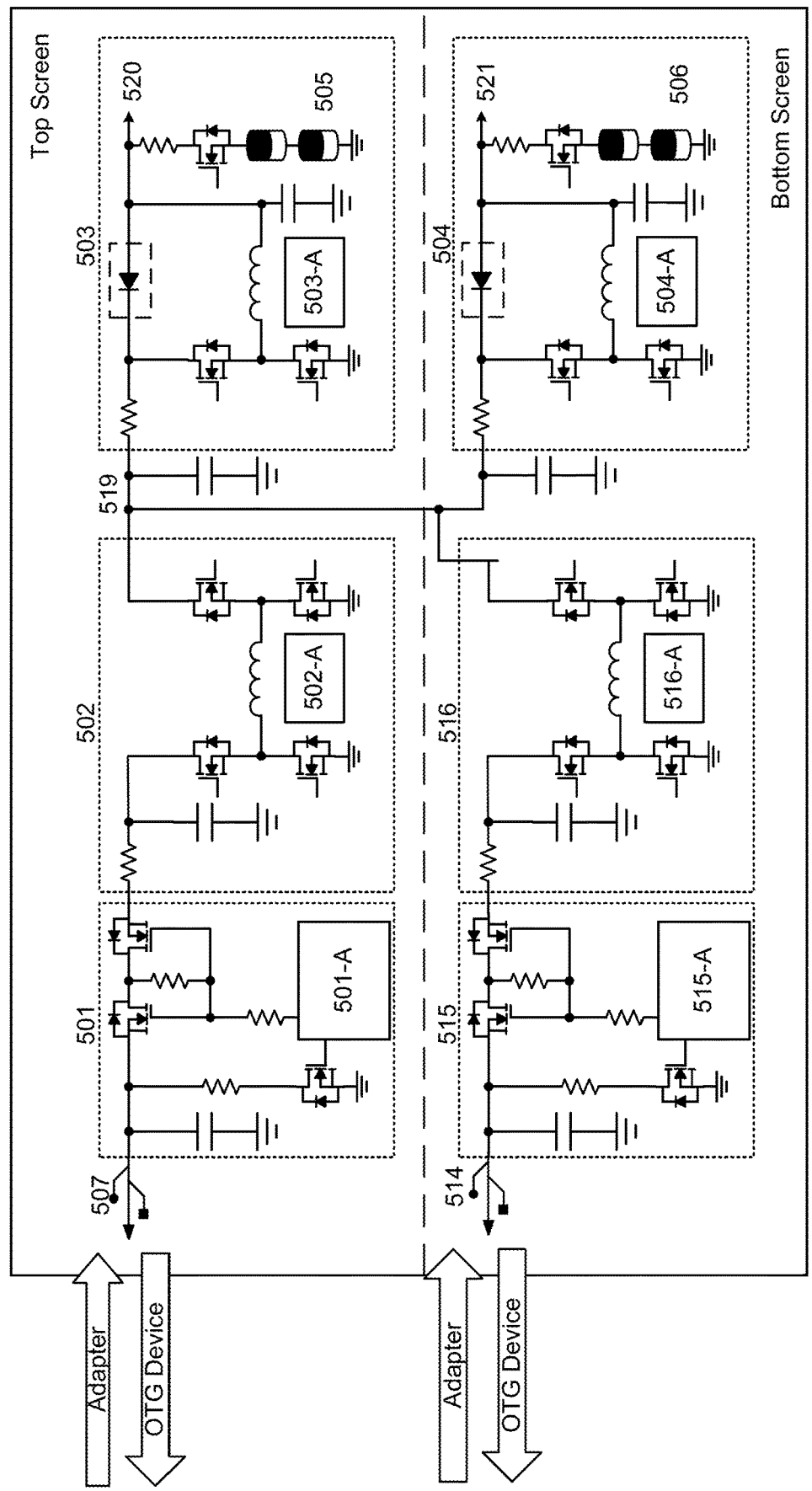
FIG. 5 is a block diagram illustrating an example adaptation of the charger in FIG. 3 for a Dual Type-C Ports application.

FIG. 5 is a block diagram illustrating an example adaptation of the charger in FIG. 3 for a Dual Type-C Ports application. As described above, the architecture of the present embodiments can easily be extended to support additional ports by adding additional voltage regulators. FIG. 5 illustrates how an additional port, and subsequently an additional voltage regulator, may be implemented according to the present embodiments.

Table 1 below illustrates how the architecture of the present embodiment supports all possible cases for an example system having dual type-C ports.

TABLE 1

| | USB type-C port 1 | | USB type-C port 2 | |
|---|---|---|---|---|
| Case | Adapter | Device | Adapter | Device |
| 1 | N/A | N/A | N/A | N/A |
| 2 | ADP1 (5 V-20 V) | | | |
| 3 | | | ADP2 (5 V-20 V) | |
| 4 | ADP1 (5 V-20 V) | | ADP2 (5 V-20 V) | |
| 5 | ADP1 (5 V-20 V) | | | OTG2 |
| 6 | | OTG1 | ADP2 (5 V-20 V) | |
| 7 | | OTG1 | | |
| 8 | | | | OTG2 |
| 9 | | OTG1 | | OTG2 |

The implementations shown in Table 1 above illustrate example two-port systems. There are several advantages to having a parallel architecture. These advantages include that the voltage from the battery chargers can be summed at Vmid 519 to support higher voltage demands. In addition, the independent batteries 505 and 506 can simultaneously support supplying two separate voltages because the voltage regulators 516 and 502 are each connected to the Vmid 519 node.

In some embodiments, two adapters may be connected to ports 507 and 514. These adapters can supply charging power for batteries 505 and 506 and satisfy load voltage 520 and 521 via chargers 503 and 504. In some embodiments, two OTG devices may be connected to ports 507 and 514, where a full range of OTG voltage (e.g. from 5V to 20V) can be supported via voltage regulators 502 and 516. In one example, an adaptor can be connected to one port 507 or 514, and an OTG device can be connected to another port 507 or 514. As discussed above, an EC can configure voltage regulator modules 502 and 516, and battery charger modules 503 and 504, such that the voltage demands of the OTG device, and the battery charging voltage requirements, are satisfied. The devices connected to the ports can be detected, for example, by TCPC functionality in controllers 501-A and 515-A in PD controller modules 501 and 515 respectively.

Although the present embodiments have been particularly described with reference to preferred examples thereof, it should be readily apparent to those of ordinary skill in the art that changes and modifications in the form and details may be made without departing from the spirit and scope of the present disclosure. It is intended that the appended claims encompass such changes and modifications.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A device comprising:
    a voltage regulator coupled to a port configured to receive input power from an external source, wherein the voltage regulator is configured to convert an input voltage from the input power to a regulated voltage;
    a first battery charger configured to provide a first system voltage based on the regulated voltage, the first battery charger further configured to charge a first battery using the regulated voltage; and
    a second battery charger configured to provide a second system voltage based on the regulated voltage, the second battery charger further configured to charge a second battery that is separate from the first battery using the regulated voltage.

2. The device of claim 1, wherein the voltage regulator comprises a buck-boost controller.

3. The device of claim 1, wherein one or both of the first battery charger and second battery charger comprises a buck controller.

4. The device of claim 1, wherein the port comprises a Universal Serial Bus (USB) type-C port.

5. The device of claim 1, wherein the device further comprises:
    the first battery configured to provide a first battery voltage to the first battery charger;
    the second battery configured to provide a second battery voltage to the second battery charger;
    the voltage regulator configured to receive a battery voltage, the battery voltage configured to be the higher voltage of the first battery voltage and the second battery voltage, the voltage regulator further configured to convert the battery voltage to an output power from an output voltage; and
    the port further configured to receive the output power and distribute the output power to an external device.

6. The device of claim 5, wherein one or both of the first battery charger and second battery charger comprises a boost controller.

7. The device of claim 5, wherein the battery voltage is configured to be the sum of the first battery voltage and the second battery voltage.

8. The device of claim 1, wherein the first battery is configured to store a battery charge that is separate from a second battery charge stored by the second battery.

9. The device of claim 1, wherein the first battery charger is further configured to distribute a first battery current supplied to the first battery, the distributed first battery current being separate from the second battery charger distributing a second battery current supplied to the second battery.

10. The device of claim 1, wherein one or both of the first battery charger and second battery charger supports full On-The-Go requirements.

11. A device comprising:
    a first voltage regulator coupled to a first port configured to receive a first input power from a first external source, wherein the first voltage regulator is configured to convert a first input voltage from the first input power to a first regulated voltage;
    a second voltage regulator coupled to a second port configured to receive a second input power from a second external source, wherein the second voltage regulator is configured to convert a second input voltage from the second input power to a second regulated voltage;
    a first battery charger configured to provide a first system voltage based on the first regulated voltage, the first battery charger further configured to charge a first battery using first the regulated voltage; and
    a second battery charger configured to provide a second system voltage based on the second regulated voltage, the second battery charger further configured to charge a second battery that is separate from the first battery using the second regulated voltage.

12. The device of claim 11, wherein one or both of the first port and the second port comprises a Universal Serial Bus (USB) type-C port.

13. The device of claim 11, wherein the device further comprises:
    the first battery configured to provide a first battery voltage to the first battery charger;
    the second battery configured to provide a second battery voltage to the second battery charger;
    the first voltage regulator configured to receive the first battery voltage, wherein the voltage regulator is further configured to convert the first battery voltage to a first output power from a first output voltage;
    the second voltage regulator configured to receive the second battery voltage, wherein the second voltage regulator is further configured to convert the second battery voltage to a second output power from a second output voltage;
    the first port coupled to a first external device, wherein the first port is configured to receive the first output power and distribute the first output power to the first external device; and
    the second port coupled to a second external device, wherein the second port is configured to receive the second output power and distribute the second output power to the second external device.

14. The device of claim 13, wherein the first output power is separate from the second output power.

15. The device of claim 11, wherein the device further comprises:
    the first voltage regulator coupled to the first port configured to distribute an output power to an external device, wherein the first voltage regulator is configured to receive a battery voltage and convert the battery voltage to the output power from an output voltage;
    the second voltage regulator coupled to the second port configured to receive an input power from an external source, wherein the second voltage regulator is configured to convert an input voltage from the input power to a regulated voltage;
    the first battery charger further configured to provide the battery voltage supplied by the first battery; and
    the second battery charger configured to provide a system voltage based on the regulated voltage, the second battery charger further configured to charge the second battery that is separate from the first battery using the regulated voltage.

16. A device comprising:
    a voltage regulator coupled to a port configured to receive an input power from an external source, wherein the voltage regulator is configured to convert an input voltage from the input power to a regulated voltage;

a first battery charger configured to provide a first system voltage based on the regulated voltage, the first battery charger further configured to charge a first battery using the regulated voltage;

a second battery charger configured to provide a second system voltage based on the regulated voltage, the second battery charger further configured to charge a second battery that is separate from the first battery using the regulated voltage; and a third battery charger configured to provide a third system voltage based on the regulated voltage, the third battery charger further configured to charge a third battery that is separate from the first battery and the second battery using the regulated voltage.

17. The device of claim 16, wherein the first battery is configured to store a battery charge that is separate from one or both of a second battery charge stored by the second battery and a third battery charge stored by the third battery.

18. The device of claim 16, wherein the first battery charger is configured to distribute a first battery current supplied to the first battery, the distributed first battery current being separate from one or both of the second battery charger distributing a second battery current supplied to the second battery and the third battery charger distributing a third battery charge current supplied to the third battery.

19. The device of claim 16, wherein in the device further comprises:

the first battery configured to provide a first battery voltage to the first battery charger;

the second battery configured to provide a second battery voltage to the second battery charger;

the third battery configured to provide a third battery voltage to the third battery charger;

the voltage regulator configured to receive a battery voltage, the battery voltage configured to be the higher voltage of the first battery voltage, the second battery voltage and the third battery voltage, the voltage regulator is further configured to convert the battery voltage to an output power from an output voltage; and the port further configured to receive the output power and distribute the output power to an external device.

20. The device of claim 19, wherein the battery voltage is configured to be the sum of the first battery voltage, the second battery voltage, and the third battery voltage.

* * * * *